United States Patent
Santhanam et al.

(10) Patent No.: US 11,086,913 B2
(45) Date of Patent: Aug. 10, 2021

(54) NAMED ENTITY RECOGNITION FROM SHORT UNSTRUCTURED TEXT

(71) Applicant: Freshworks Inc., San Bruno, CA (US)

(72) Inventors: Navaneethan Santhanam, Chennai (IN); Saurabh Arora, Chennai (IN); Satyam Saxena, Chennai (IN); Anuj Gupta, Chennai (IN)

(*) Notice: Subject to any disclaimer, the term of this patent is extended or adjusted under 35 U.S.C. 154(b) by 218 days.

(21) Appl. No.: 15/922,779

(22) Filed: Mar. 15, 2018

(65) Prior Publication Data

US 2019/0205463 A1    Jul. 4, 2019

(30) Foreign Application Priority Data

Jan. 2, 2018    (IN) .............................. 201841000125

(51) Int. Cl.
| | | |
|---|---|---|
| *G06F 16/33* | (2019.01) | |
| *G06F 16/335* | (2019.01) | |
| *G06F 16/35* | (2019.01) | |
| *G06F 40/216* | (2020.01) | |
| *G06F 40/295* | (2020.01) | |

(52) U.S. Cl.
CPC ........ *G06F 16/3346* (2019.01); *G06F 16/335* (2019.01); *G06F 16/3347* (2019.01); *G06F 16/353* (2019.01); *G06F 40/216* (2020.01); *G06F 40/295* (2020.01)

(58) Field of Classification Search
USPC ........................................................ 707/692
See application file for complete search history.

(56) References Cited

U.S. PATENT DOCUMENTS

| | | | | |
|---|---|---|---|---|
| 9,348,815 | B1* | 5/2016 | Estes | G06F 17/2785 |
| 9,602,987 | B1* | 3/2017 | Wittig | H04L 51/12 |
| 2009/0285474 | A1* | 11/2009 | Berteau | G06F 16/353 |
| | | | | 382/159 |
| 2011/0213742 | A1* | 9/2011 | Lemmond | G06F 16/3344 |
| | | | | 706/13 |
| 2011/0270604 | A1* | 11/2011 | Qi | G06F 17/271 |
| | | | | 704/9 |
| 2014/0006408 | A1 | 1/2014 | Rae et al. | |
| 2014/0172774 | A1 | 6/2014 | Liu et al. | |
| 2015/0199333 | A1* | 7/2015 | Nekhay | G06F 17/278 |
| | | | | 704/9 |
| 2015/0286629 | A1 | 10/2015 | Abdel-Reheem et al. | |
| 2016/0314123 | A1* | 10/2016 | Ramachandran | |
| | | | | G06F 16/24578 |
| 2017/0060835 | A1* | 3/2017 | Radford | G06F 17/277 |
| 2017/0091164 | A1* | 3/2017 | Bao | G06F 17/241 |
| 2017/0098013 | A1* | 4/2017 | Shirwadkar | G06F 16/36 |
| 2017/0300565 | A1* | 10/2017 | Calapodescu | G06F 16/3325 |
| 2017/0329842 | A1* | 11/2017 | Ng Tari | G06F 3/04842 |
| 2017/0357716 | A1* | 12/2017 | Bellegarda | G06F 3/16 |
| 2017/0364503 | A1* | 12/2017 | Anisimovich | G06F 40/211 |

\* cited by examiner

*Primary Examiner* — Hosain T Alam
*Assistant Examiner* — Nicholas E Allen
(74) *Attorney, Agent, or Firm* — LeonardPatel PC

(57) ABSTRACT

A process for extracting and recognizing named entities from a short unstructured chat-style text input. The process may tokenize an inbound electronic message, and use a combination of entity specific classifiers and databases comprising known named entities such as gazetteer(s) to identify one or more named entities within the inbound electronic message. The identified named entities are then compiled as response message and transmitted to the user.

21 Claims, 8 Drawing Sheets

600A

600B

NAMED ENTITY RECOGNITION FROM SHORT UNSTRUCTURED TEXT

CROSS REFERENCE TO RELATED APPLICATION

This application claims the benefit of, and priority, Indian Provisional Patent Application No. 201841000125 filed Jan. 2, 2018. The subject matter of this earlier-filed application is hereby incorporated by reference in its entirety.

FIELD

The present invention relates to extracting and recognizing text, and more particularly, to a process for extracting and recognizing named entities from a short unstructured text input such as those used in chat, social media, messaging, etc.

BACKGROUND

Existing publicly-available systems that perform named entity recognition (NER) often do a poor job of extracting named entities (e.g., person's location, person's name, person's company or organization, address, landmarks, etc.) from short, unstructured text inputs. For example, many of the existing systems perform poorly on chat-style datasets.

Currently, most open-source NER systems and advances in NER systems are benchmarked against two publicly available datasets—CoNLL 2003 (Conference on Natural Language Learning) and ATIS (Air Traffic Information System). These datasets are for longer sentences than are usually used in chat messages and may not be relevant. Further, the datasets generally include complete sentences, which are entirely different than the content of a chat message. For example, chat messages are characterized by short-phrases partial sentences and single-word responses between two or more parties. They may also contain incorrect grammar or spelling, and may be at odds with more formally-written English. Moreover, both the datasets are biased towards North American and European entities, and therefore, lack other entities in the world. Furthermore, these datasets may not be representative of the diversity of named entities that may be found in chat messages, which could come from other regions of the world.

Thus, most publicly-available NER systems, which have been trained using CoNLL 2003 and ATIS, are not efficient or accurate when identifying named entities from short, unstructured text inputs.

Thus, an alternative approach may be more beneficial.

SUMMARY

Certain embodiments of the present invention may provide solutions to the problems and needs in the art that have not yet been fully identified, appreciated, or solved by current NER systems. For example, some embodiments generally pertain to a NER system that extracts and identifies named entities such as person's location, person's name, and person's company.

In one embodiment, a computer-implemented method for recognizing named entities in a message. The method includes receiving an electronic message and tokenizing the electronic message. The method also includes probabilistically identifying whether each token constitutes a named entity, wherein each token is a continuous sequence of characters grouped together. The method further includes simultaneously comparing each token with one or more databases comprising known named entities, and returning a response message to the user when one or more named entities are found in the electronic message. The response message identifies the one or more named entities from the comparison. Alternatively, the method includes returning a null response message when the comparison fails to identify named entities in the electronic message.

In another embodiment, an apparatus may include at least one processor and memory comprising a set of instructions. The set of instructions are configured to cause the at least one processor to receive an electronic message and tokenize the electronic message. The set of instructions are further configured to cause the at least one processor to probabilistically identify whether each token constitutes a named entity, wherein each token is a continuous sequence of characters grouped together. The set of instructions are further configured to cause the at least one processor to simultaneously compare each token, with one or more databases comprising known named entities, and return a response message to the user when one or more named entities are found in the electronic message. The response message identifies the one or more named entities from the comparison. Alternatively, the set of instructions are configured to cause the at least one processor to return a null response message when the comparison fails to identify named entities in the electronic message.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Companies or products that deploy chatbots allow a user to converse with the chatbot when the user visits a website, mobile application, or a webpage of the company. The chatbot may be a computer program that conducts a conversation via auditory or textual methods. The chatbot is designed to simulate how a human may converse with a conversational partner.

It may be desirable for the company to capture information (or named entities) while the user is communicating with the chatbot via a chat interface. For example, it may be beneficial to capture the named entities such as user's name, city or state he or she lives in, the company he or she works for, etc. To capture this information, some embodiments generally pertain to a NER system that receives natural language sentences in a predefined language, such as English, and identifies the named entities. See, for example Tables 1-4 showing sentences and corresponding names.

TABLE 1

NER - Locations

| Sentences | Entities |
| --- | --- |
| I live in New York | New York |
| My hometown is called San Francisco | San Francisco |
| I come frm a small town in Texas | Texas |
| The city of Seattle was cloudy today | Seattle |
| I'm frm Bejing | Bejing |
| I have lived in Chennai and Bangalore | Chennai, Bangalore |

TABLE 2

NER - Names

| Sentences | Entities |
| --- | --- |
| Pls call me Ishmael | Ishmael |
| I go by George Smith | George Smith |
| My frnds call me Tom | Tom |
| My name is Phil | Phil |
| Friends call me Al | Al |
| Although my name is Jeff, friends call me Bob | Jeff, Bob |

TABLE 3

NER - Organizations

| Sentences | Entities |
| --- | --- |
| I work at Freshworks | Freshworks |
| My company is called Google | Google |
| Facebook is where I wrk | Facebook |
| I am an Apple employee | Apple |
| Before working at Zarget, I was at Zoho | Zarget, Zoho |

TABLE 4

NER - Mixed Location, Name, and/or Organization

| Sentences | Entities |
| --- | --- |
| I wrk with TCS in Chennai | TCS, Chennai |
| My name is Jack and I live in Paris | Jack, Paris |
| Girish is the CEO of Freshworks | Girish, Freshworks |
| Thomas Watson started IBM in New York | Thomas Watson, IBM, New York |

The NER system may use one or more techniques to extract named entities from chat-style sentences in an intelligent and flexible manner that enable chatbot interfaces to seamlessly and naturally interact with the user. This NER system differs from the existing NER systems, because the existing NER systems take advantage of static knowledge available (from existing databases such as those discussed above) in regard to the named entities. In some embodiments, however, the NER system is dynamic, i.e., NER systems parses and understands natural language by using a tokenizing process, and probabilistically reasons out where in the sentence a named entity might be found, or whether one or more named entities is present, within the chat message.

Figure 1:
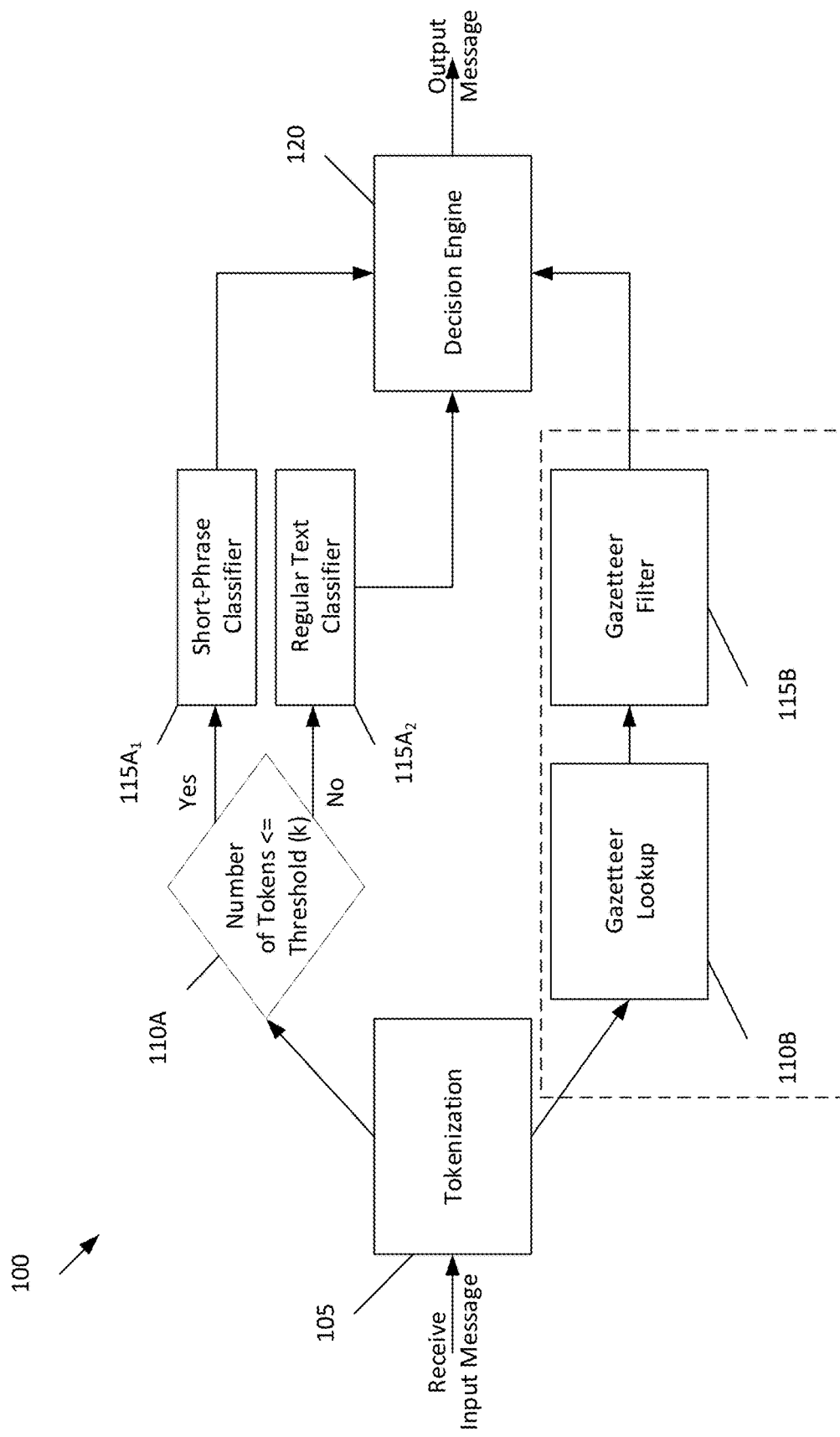
FIG. 1 is a flow diagram illustrating a process for performing NER, according to an embodiment of the present invention.

FIG. 1 is a flow diagram illustrating a process 100 for performing NER, according to an embodiment of the present invention. In some embodiments, process 100 may execute a NER module for determining whether a user's name, location, or organization is included within a chat message. It should be appreciated that process 100 is not limited to determining whether a user's name, location, or organization is included within a chat message, and may determine other entities such as a user's position, age, etc.

Process 100 may begin at 105 with the NER module parsing a chat message, which is received from the user, and converting the chat message into tokens. In some embodiments, each token is a continuous sequence of characters grouped together. For example, if the message received says "I am frm Chennai", then the message is parsed and broken up into four tokens, namely: ['I', 'am', 'frm', 'Chennai']. In some embodiments, tokens are sub-words, words, punctuation, or parts of speech such as (but not limited to) comma, hyphen, slash, or apostrophe. Given that the chat conversations don't always use well formed sentences, the tokens may not always be valid dictionary words. For example, if the message received says "Howdy, I m known as @John.", then the message is parsed and broken up into seven tokens, namely: ['Howdy', ',', 'I', 'm', 'known', 'as', '@', 'John', '.']. By tokenizing the chat message, the named entity can be recognized quicker and more accurately. It should be appreciated that a different tokenization scheme or algorithm may give a different set of token for the same sentence. For example, the aforementioned message could also be tokenized as 'Howdy', ',', 'I', 'm', 'known', 'as', '@John', '.'.

At 110A, the NER module determines if the number of tokens is less than or equal to a predefined number or threshold number, (k). If the number of tokens is less than or equal to the threshold number, then at $115A_1$, the NER module accesses a short-phrase classifier to identify which word or sequence of consecutive words in the list of tokens (or words) is a named entity. For example, if the number of tokens is less than or equal to the threshold number, the short-phrase classifier is invoked at $115A_1$ to probabilistically identify whether a token or sequence of tokens in the input constitutes a named entity, or whether no named entities are present in the input. To probabilistically identify a named entity, the short-phrase classifier uses machine learning techniques, such as Structured Support Vector Machines (Structured SVM), to achieve the same. This technique projects the sequence of tokens in a d-dimension vector space, where d is usually 100, 200, 300 or 600. After this conversion step, the short-phrase classifier may apply a kernel trick to each token vector by further projecting the token vectors in a very very high dimensional space where a linear separation is possible. This provides the maximum likelihood of distinguishing the sequences of tokens representing named entities from other sequences that do not represent named entities.

If, however, there are more tokens in the input than the threshold number, then the regular text classifier is invoked at $115A_2$. For example, if the number of tokens are greater than the threshold number, then at 115A$_2$, the NER module accesses the regular text classifier to identify which word in the sequence of tokens (or words) is a named entity. This regular text classifier may use the same or similar technique as the short-phrase classifier to identify sequences of tokens representing named entities. It should be noted that by using short-phrase classifier and/or regular text classifier depending on the number of tokens, the process of identifying the named entity or entities can be executed in a more accurate manner, thereby eliminating errors.

If the process is attempting to recognize the user's name, the process may continue to 120. Otherwise, for location-based and organization-based NERs, running simultaneously with steps 110A and 115A$_1$ and 115A$_2$, the NER module at 110B accesses a Gazetteer lookup, which is a database, and scans for a recognized named entity. In some embodiments, the database may include a list of locations and companies, for example. In other embodiments, there may be a separate database, each database containing either a list of locations or a list of companies. At 115B, the NER module accesses the Gazetteer Filter to filter out words that do not match with the named entity. Using the above example of "I am from Chennai", because the chat message is broken up into tokens, each token that is not a named entity is filtered based on a result of the scan. Thus, the result of the filter may return the word Chennai as a known location.

In another example, if the message was 'I am from Hyderabad Secunderabad, the message is converted into the token sequence ['I', 'am', 'from', 'Hyderabad', 'Secunderabad'], where 'Hyderabad' and 'Secunderabad' were separately present in the database and also together as 'Hyderabad Secunderabad'. In this example, the NER module causes the Gazetteer Filter to retain the longest sequence or combination, and to selectively discard other database matches that are a subset of the longest identified named entity in the longer entity, resulting (in this case) in only one named entity output, 'Hyderabad Secunderabad'.

At 120, the NER module accesses the decision engine to check if the results from 115A$_1$ or 115A$_2$ and 115B have an overlap. For example, the NER module determines if the results returned the same named entities, and if there is an overlap, i.e., there is a superset and a subset, then the superset is returned. Let's say for example that the flow from 110B and 115B (gazetteer) identified New York as a location, and that the flow from 110A and 115A$_1$ or 115A$_2$ (short-phrase classifier or regular text classifier) identified New York City as the location. In this example, the NER module may determine that New York is a subset of New York City, and may return New York City, which is the superset, as the location for the named entity.

Using the decision engine at 120, the NER module may also determine if there is an exact match to remove duplications. For example, if gazetteer and short-phrase classifier or regular text classifier, both identified "Irvine" as the location for the named entity, then the NER module may remove the duplicate.

In another example, assume that during the tokenization step the word Urbana-Champaign were separated as tokens. Because the gazetteer and short-phrase-classifier or regular text classifier may return separate words, each of which is identified as a location-entity, the NER module may access the decision engine at 120 to combine the separated words to form the correct location name for the named entity. This may work for all consecutive tokens identified separately as named entities, or for tokens separated by certain kinds of punctuation marks, viz. comma or hyphen.

It should be appreciated that process 100 may be executed separately for each named entity in a sequential or simultaneous manner. For example, process 100 may be executed for identifying names, locations, company/organization, etc., in a sequential or simultaneous manner.

Figure 2:
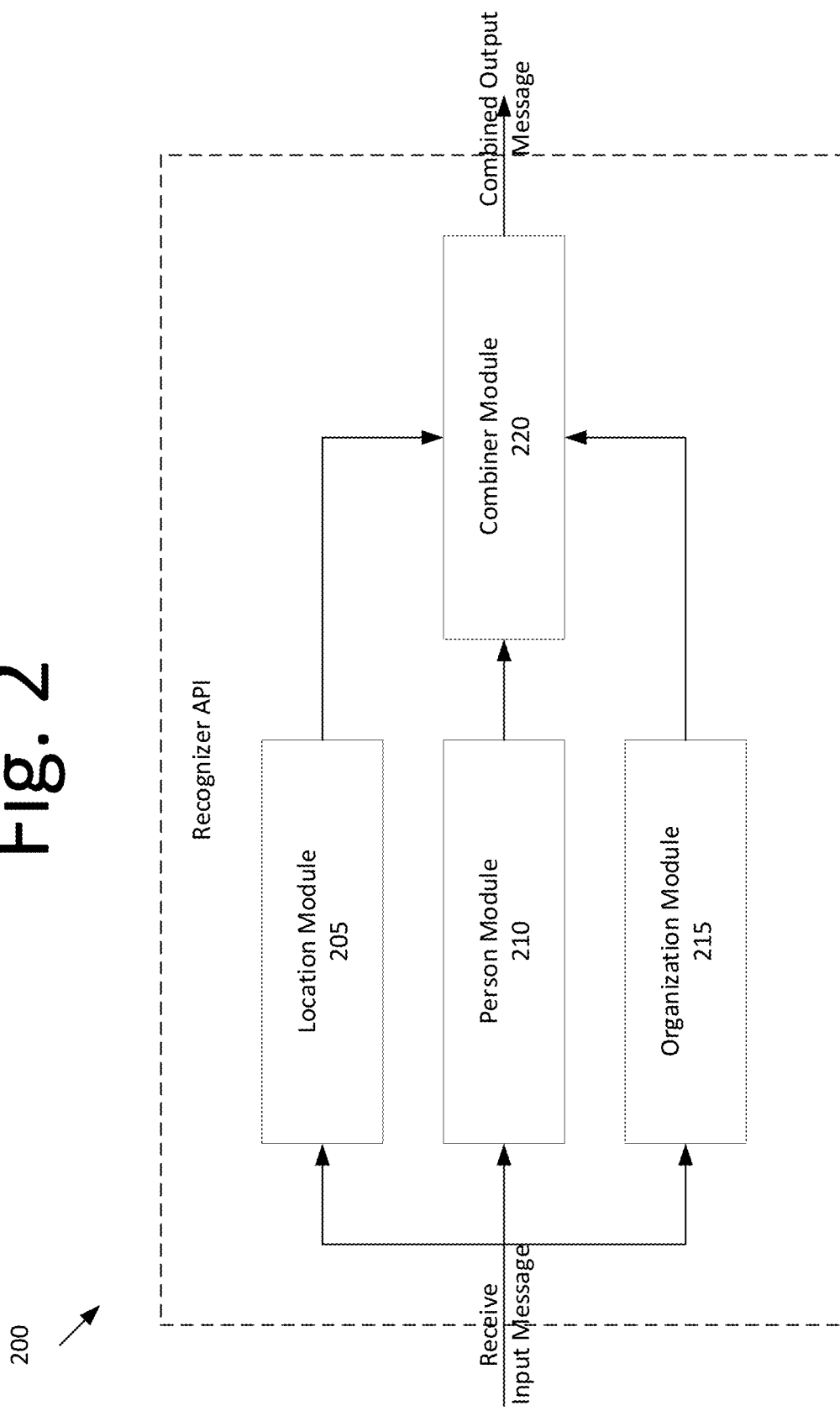
FIG. 2 is a flow diagram illustrating operations of a recognizer application programming interface (API) for performing NER, according to an embodiment of the present invention.

FIG. 2 is a flow diagram illustrating operations of a recognizer API for performing NER, according to an embodiment of the present invention. In some embodiments, a user may submit in a chat message their name, location, and company information. See, for example, FIG. 4. In those embodiments, the NER module may execute a recognizer API 200 in order to perform NER.

Figure 4:
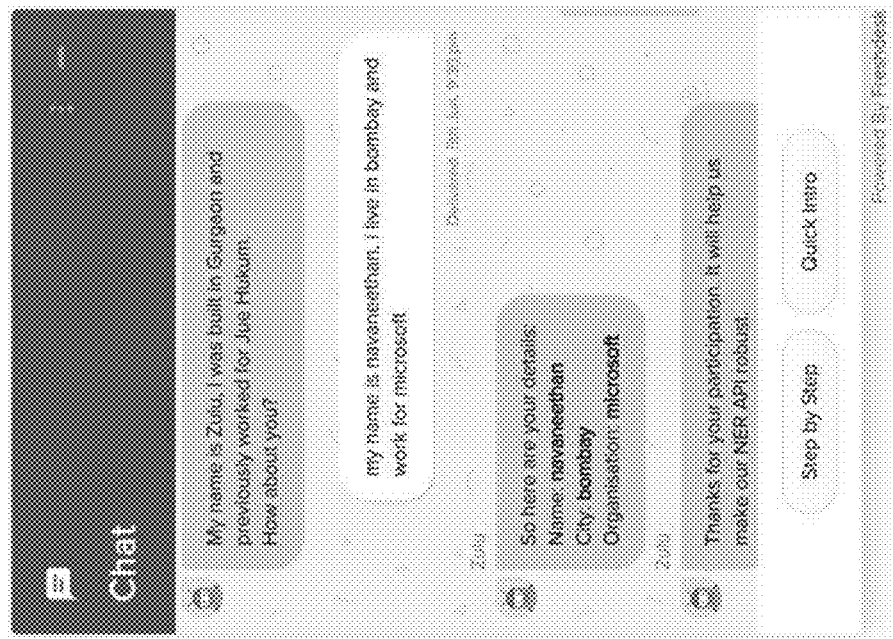
FIG. 4 is a graphical user interface (GUI) illustrating a chat message, according to an embodiment of the present invention.

Using FIG. 4 as an example, recognizer API 200 may receive the input message, and execute either separately or concurrently location module 205, person module 210, and organization module 215. These modules essentially perform the process shown in FIG. 1, for example, and return the result (user's name, user's location, and/or user's company) to combiner 220. Combiner 220 may receive the results from each module 205, 210, and 215, and combine the results and return the results as shown in FIG. 4, for example.

Figure 3:
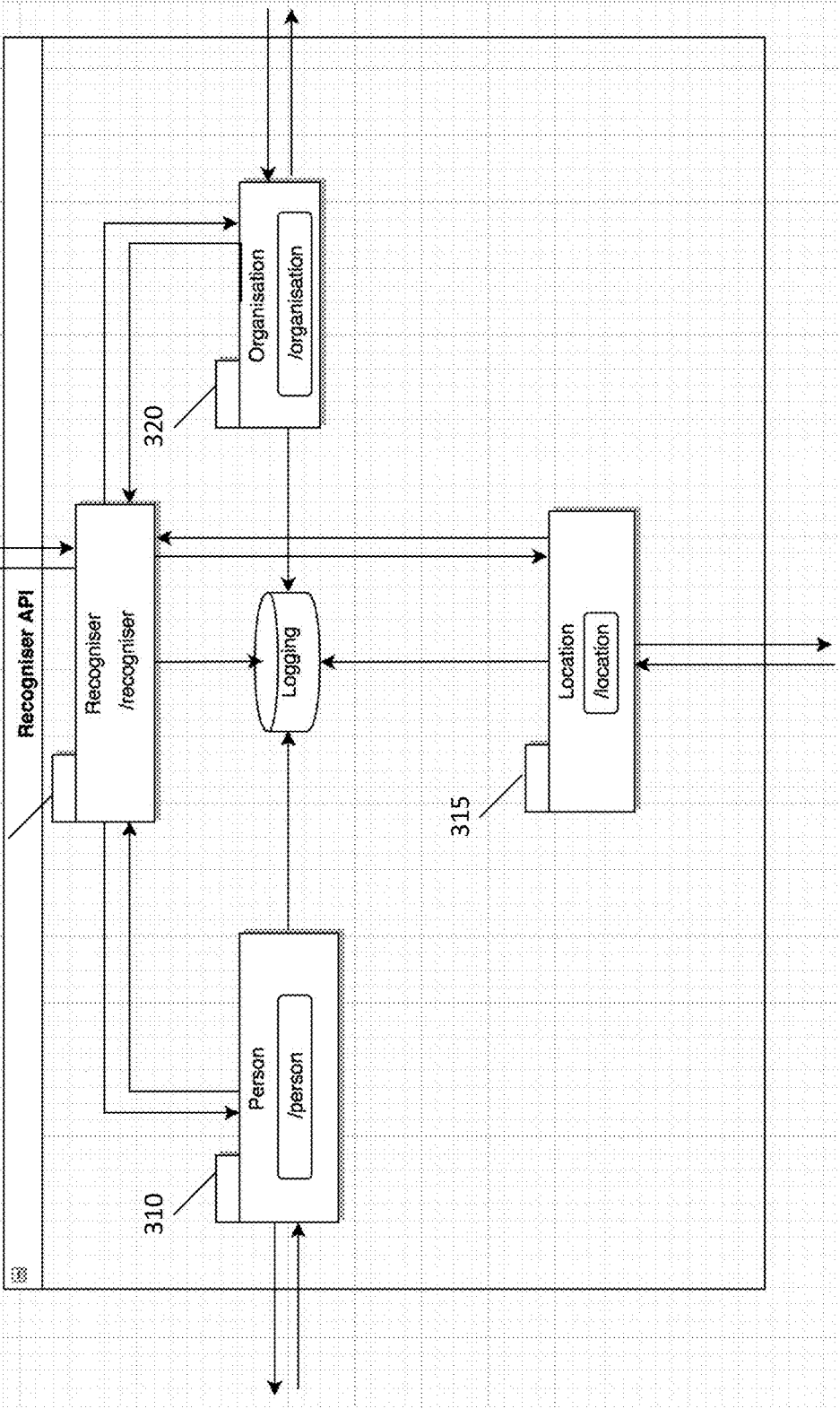
FIG. 3 is a system diagram illustrating the NER architecture, according to an embodiment of the present invention.

FIG. 3 is a system diagram illustrating the NER architecture 300, according to an embodiment of the present invention. In some embodiments, NER architecture 300 includes a recognizer module 305 that may be executed by the NER module. When an input (or chat message) is received, recognizer 305 may call or execute one or more modules—person module 310, location module 315, and organization module 320. Each module—person module 310, location module 315, and organization module 320—may probabilistically identify a person, location, organization, respectively, in a sentence. The output from each module is returned to recognizer module 305, which is returned in a response message to the user, for example. See, for example, FIG. 4.

Logging module 325 in some embodiments may maintain a log of all chat messages that are received, including but not limited to maintaining a log of all words within the chat messages, the returned results, etc. This allows the NER system to keep track of all communications between the chatbot and user. In addition to maintaining a record, the logging module enables identifying situations where entities in the user's input were incorrectly identified in an offline matter. The contents of the log can thus be parsed in a periodical fashion to add improvements to the NER module and enable more effective communication between chatbot and user in the future.

FIG. 4 is a graphical user interface (GUI) 400 illustrating a chat message, according to an embodiment of the present invention. In GUI 400, the chat message may between the user and a chatbot. In this embodiment, GUI shows the user providing his name, city, and company he or she works for. The NER system parses the input message to determine the name, location, and company. Upon determining this information, the GUI shows the chatbot providing these details back to the user.

Figure 5:
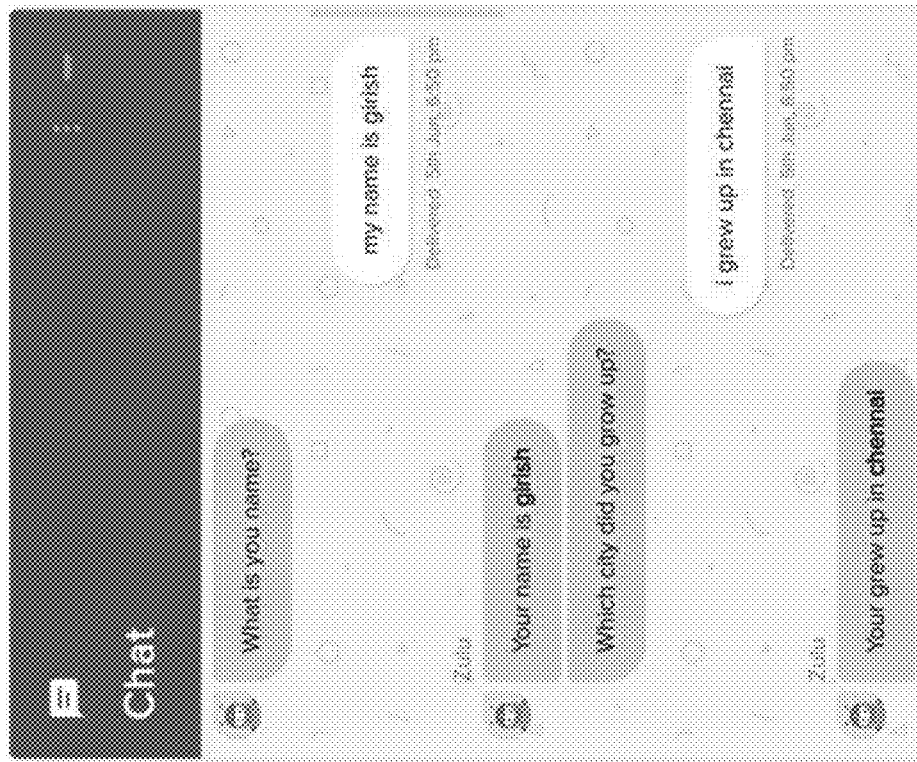
FIG. 5 is a GUI illustrating a chat message showing identification of a person's name and location, according to an embodiment of the present invention.

FIG. 5 is a GUI 500 illustrating a chat message showing identification of a person's name and location, according to an embodiment of the present invention. GUI 500 shows communication between a chatbot and a user. In this embodiment, when the user introduces himself, the chatbot may recognize the user's name using the NER module, and continue the conversation in a more personalized manner.

Figure 6A:
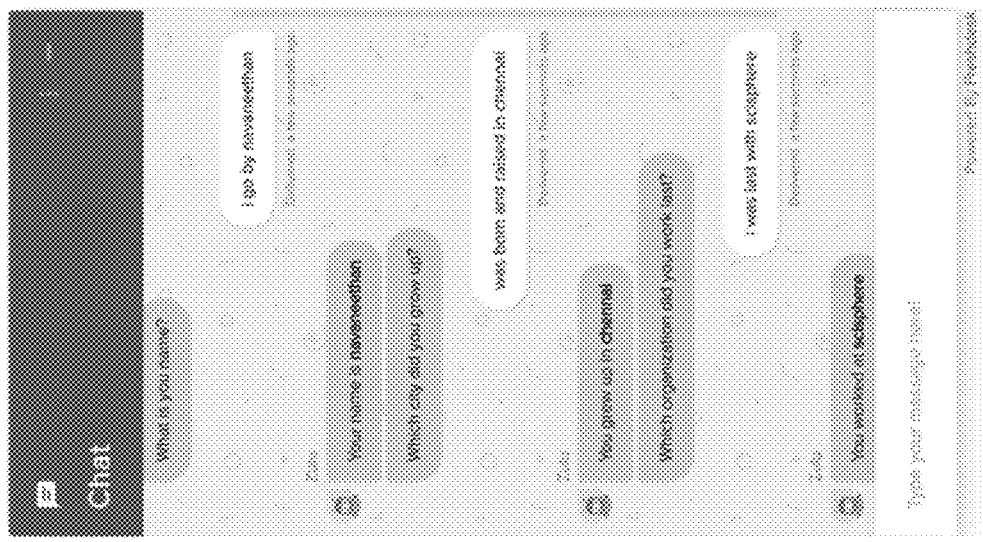
FIGS. 6A and 6B are GUIs illustrating a chat message showing identification of a person's name, location, and company, according to an embodiment of the present invention.
Figure 6B:
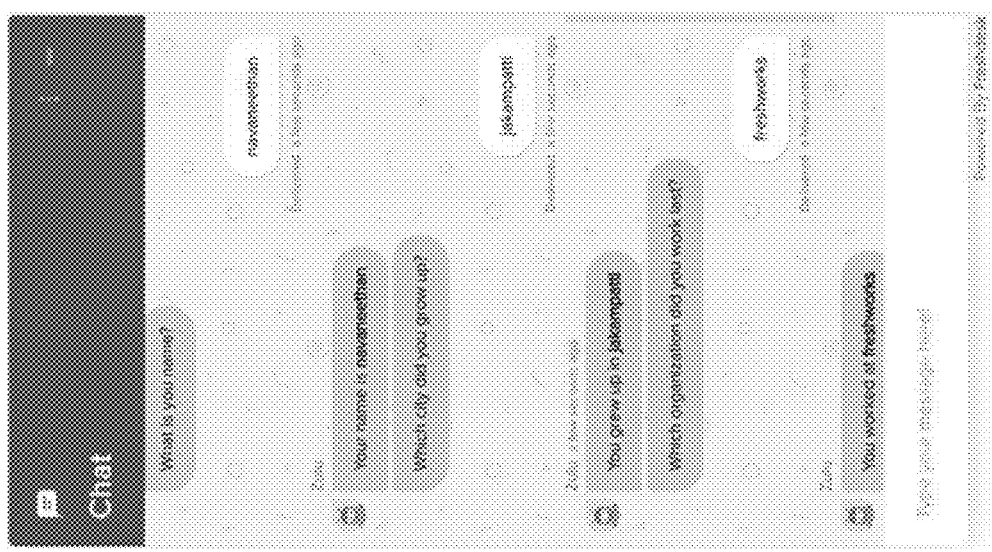

FIGS. 6A and 6B are GUIs 600A and 600B illustrating a chat message showing identification of a person's name, location, and company, according to an embodiment of the present invention. GUI 600A shows communication between chatbot and the user regarding the user's name, user's city, and previous organization. In this embodiment, chatbot may recognize the user's information by using NER module during for each message that is received from the user. GUI 600B shows a similar communication between the chatbot and user recognizing the user's information by using the NER module.

Figure 7:
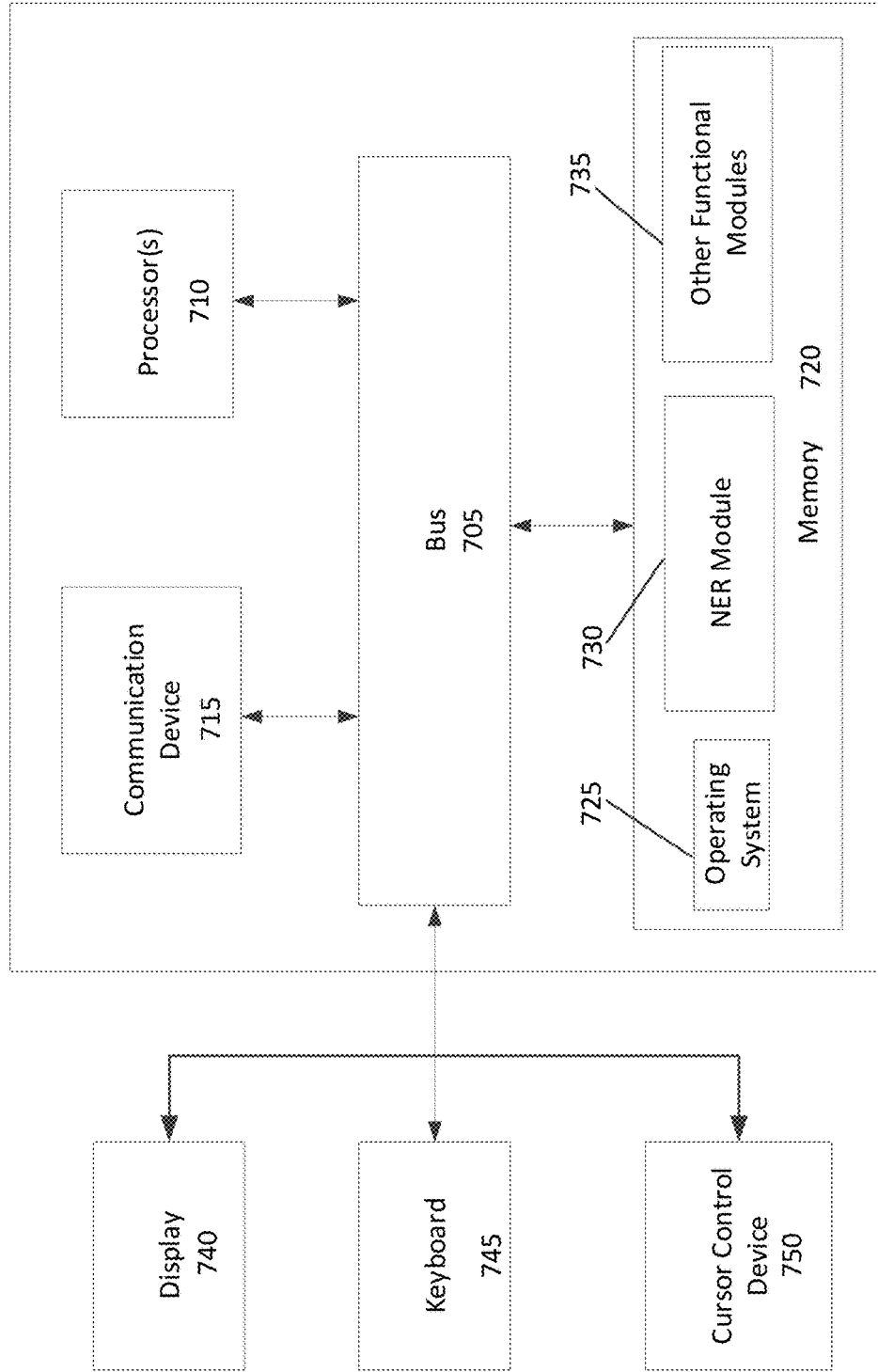
FIG. 7 is a block diagram illustrating a computing system for executing the NER system, according to an embodiment of the present invention.

FIG. 7 is a block diagram illustrating a computing system 700 for performing NER, according to an embodiment of the present invention. Computing system 700 may include a bus 705 or other communication mechanism configured to communicate information, and at least one processor 710, coupled to bus 705, configured to process information. At least one processor 710 can be any type of general or specific purpose processor. Computing system 700 may also include memory 720 configured to store information and instructions to be executed by at least one processor 710. Memory 720 can be comprised of any combination of random access memory ("RAM"), read only memory ("ROM"), static storage such as a magnetic or optical disk, or any other type of computer readable medium. Computing system 700 may also include a communication device 715, such as a network interface card, configured to provide access to a network.

The computer readable medium may be any available media that can be accessed by at least one processor 710. The computer readable medium may include both volatile and nonvolatile medium, removable and non-removable media, and communication media. The communication media may include computer readable instructions, data structures, program modules, or other data and may include any information delivery media.

At least one processor 710 can also be coupled via bus 705 to a display 740, such as a Liquid Crystal Display ("LCD"). Display 740 may display information to the user, such as recognized name, location, and company, for example. A keyboard 745 and a cursor control unit 750, such as a computer mouse, may also be coupled to bus 705 to enable the user to interface with computing system 700. In embodiments where computing system 700 resides on a mobile device, display 740 may be a haptic device, which includes a digital keyboard 745 and a cursor control device 750.

According to one embodiment, memory 720 may store software modules that may provide functionality when executed by at least one processor 710. The modules can include an operating system 725 and a NER module 130 for recognizing a user's information, as well as other functional modules 735. Operating system 725 may provide operating system functionality for computing system 700. Because computing system 700 may be part of a larger system, computing system 700 may include one or more additional functional modules 135 to include the additional functionality.

One skilled in the art will appreciate that a "system" could be embodied as a personal computer, a server, a console, a personal digital assistant (PDA), a cell phone, a tablet computing device, or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The process shown in FIG. 1 may be performed, in part, by a computer program, encoding instructions for a nonlinear adaptive processor to cause at least the process described in FIG. 1 to be performed by the apparatuses discussed herein. The computer program may be embodied on a non-transitory computer readable medium. The computer readable medium may be, but is not limited to, a hard disk drive, a flash device, a random access memory, a tape, or any other such medium used to store data. The computer program may include encoded instructions for controlling the nonlinear adaptive processor to implement the process described in FIG. 1, which may also be stored on the computer readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, or an application specific integrated circuit ("ASIC").

Data Collection

To train models that fit the chat use case, one or more data sources may be used to populate a training dataset. For example, publicly available datasets such as CoNLL 2003™ and ATIS™ may be used to handle longer sentences.

Other publicly available datasets such as DBpedia™ may be used to systematically extract and sample from a widely-distributed globally relevant set of names, locations, and organizations. The sampling may have been done in a manner that captures named entities from various regions and cultures, named entities with varying numbers of words, named entities starting with each letter of the alphabet, and named entities with different numbers of characters.

Training Set Generation

To handle the diverse responses that one may expect from a user using a chat interface, a training set may be built to train a highly accurate short-phrase classifier and regular text classifier to accommodate various scenarios. For example, sentences such as 'The European Union bans imports of beef and cow from the UK' and 'please list all flights from Boston to Los Angeles with a stopover in Chicago' were built into the training set. For the NER module, the above example may be augmented to be incorporated in the NER database(s).

To augment these traditional training datasets with training sets that may be more specific and relevant to the chat use case, sentence templates were identified, e.g., an extensive set of common formats in which various named entities may be embedded in sentences. For example, phrases such as 'I live in <LOCATION>', 'My name is <NAME>', and 'I work at <ORGANTZATION>', where LOCATION, NAME, and ORGANIZATION are replaced by the respective locations, person names, and company names. It should be appreciated that the above examples are a few sentence templates, and there are several others used to capture a wide range of inputs that the user may use. These named entities may come from the named entities sampled from DBpedia™, for example.

As sentences in a chat can often be noisy, incomplete, poorly-phrased, and highly 'irregular', a training set may be built by pulling fragments of sentences containing named entities from various databases, and may be embedded in the sentence templates above. Examples of fragment sentences may include 'the EU bans', 'from the UK', 'from Boston to', and 'in Chicago', and examples of generated sentences may include 'I work for the EU bans', and 'I live in from the UK'.

Model Separation

Unlike existing open-source NER systems that use a single model to detect multiple entities (e.g., a single model that detects location, name, and organization), some embodiments leverage separate models for each named entity. These embodiments allow each model to specialize in one domain with a specific training set rather than to be dispersed across multiple domains. This leverages an understanding of the chat domain, there sentences are short and often contain information specific to one type of named entity, not multiple types.

Gazetteer

In some embodiment, when searching for a location NER and/or organization NER, Gazetteer module may check whether a group of contiguous words match a known set of named entities. See, for example, FIG. 1.

In some other embodiments, the NER system may combine outputs from multiple sub-systems (classifier modules and gazetteer modules) to present a unified, comprehensive set of entities within a sentence.

It will be readily understood that the components of various embodiments of the present invention, as generally described and illustrated in the figures herein, may be arranged and designed in a wide variety of different configurations. Thus, the detailed description of the embodiments, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer-implemented method for recognizing named entities in a message, comprising:
    receiving an electronic message;
    tokenizing the electronic message;
    probabilistically identifying, using either a short-phrase classifier or a regular text classifier, whether each token constitutes a named entity, thereby identifying one or more named entities within the electronic message, wherein each token is a continuous sequence of characters grouped together, and wherein the probabilistically identifying comprises accessing the short-term classifier or the regular text classifier depending on whether the number of tokens being less than or equal to a predefined number or a threshold number;
    comparing each token with one or more databases comprising known named entities, thereby identifying the one or more name entities within the electronic message, wherein
    the probabilistically identifying and the comparing of each token is performed simultaneously; and
    returning a response message to the user when the one or more named entities are found in the electronic message, wherein the response message identifies the one or more named entities from the comparison, or returning a null response message when the comparison fails to identify named entities in the electronic message.

2. The computer-implemented method of claim 1, wherein the named entities comprise a name, a location, and/or an organization.

3. The computer-implemented method of claim 1, wherein the tokenizing of the electronic message comprises converting each sub-word, word, or punctuation within the electronic message into tokens for recognizing the one or more named entities.

4. The computer-implemented method of claim 1, wherein the probabilistically identifying comprises accessing a short-phrase classifier to probabilistically identify whether one or more tokens or a sequence of tokens constitutes the one or more named entities, when a number of tokens is less than or equal to a threshold.

5. The computer-implemented method of claim 1, wherein a process for probabilistically identifying comprises projecting the one or more tokens or the sequence of tokens in a d-dimension vector space, where d is 100, 200, 300, or 600; and further projecting a token vector for each of the one or more tokens or the sequence of tokens to a dimensional space where linear separation is possible, providing a maximum likelihood of distinguishing the one or more tokens or the sequences of tokens representing the one or more named entities from other tokens or sequences that do not represent named entities.

6. The computer-implemented method of claim 1, further comprising accessing a regular text classifier to probabilistically identify whether one or more tokens or a sequence of tokens constitutes the one or more named entities, when a number of tokens is greater than a threshold.

7. The computer-implemented method of claim 1, further comprising accessing one or more gazetteer lookup databases to scan for a recognized named entity; and filtering each token that fails to match with a named entity to quickly identify a token that contains the named entity.

8. The computer-implemented method of claim 1, further comprising:

removing duplicates for the one or more named entities by comparing a result from a short-phrase classifier, a regular text classifier, a gazetteer lookup database, or any combination thereof.

9. The computer-implemented method of claim 1, further comprising:

combining one or more tokens to form the one or more named entities, wherein the one or more tokens are results from a short-phrase classifier, a regular text classifier, a gazetteer lookup database, or any combination thereof.

10. The computer-implemented method of claim 1, further comprising:

selecting a superset of the one or more named entities when a short-phrase classifier, a regular text classifier, a gazetteer lookup database, or any combination thereof returns the superset of the one or more named entities and a subset of the superset of the one or more named entities.

11. An apparatus for recognizing named entities in an electronic communication, comprising:

at least one processor; and memory comprising a set of instructions, wherein the set of instructions are configured to cause the at least one processor to receive an electronic message;

tokenize the electronic message;

probabilistically identify, using either a short-phrase classifier or a regular text classifier, whether each token constitutes a named entity, thereby identifying one or more named entities within the electronic message, wherein each token is a continuous sequence of characters grouped together, and wherein the probabilistically identifying comprises access the short-term classifier or the regular text classifier depending on whether the number of tokens being less than or equal to a predefined number or a threshold number;

compare each token, with one or more databases comprising known named entities, thereby identified the one or more name entities within the electronic message, wherein the probabilistically identifying and the comparing of each token is performed simultaneously; and return a response message to the user when the one or more named entities are found in the electronic message, wherein the response message identifies the one or more named entities from the comparison, or return a null response message when the comparison fails to identify named entities in the electronic message.

12. The apparatus of claim 11, wherein the named entities comprise a name, a location, and/or an organization.

13. The apparatus of claim 11, wherein the set of instructions are further configured to cause the at least one processor to convert each sub-word, word, or punctuation within the electronic message into tokens for recognizing the one or more named entities.

14. The apparatus of claim 11, wherein the set of instructions are further configured to cause the at least one processor to access a short-phrase classifier to probabilistically identify whether one or more tokens or a sequence of tokens constitutes the one or more named entities when a number of tokens is less than or equal to a threshold.

15. The apparatus of claim 11, wherein the set of instructions are further configured to cause the at least one processor to project the one or more tokens or the sequence of tokens in a d-dimension vector space, where d is 100, 200, 300, or 600; and further project a token vector for each of the one or more tokens or the sequence of tokens to a dimensional space where linear separation is possible, providing a maximum likelihood of distinguishing the one or more tokens or the sequences of tokens representing the one or more named entities from other tokens or sequences that do not represent named entities.

16. The apparatus of claim 12, wherein the set of instructions are further configured to cause the at least one processor to access a regular text classifier to probabilistically identify whether one or more tokens or a sequence of tokens constitutes the one or more named entities when a number of tokens is greater than a threshold.

17. The apparatus of claim 11, wherein the set of instructions are further configured to cause the at least one processor to
- access one or more gazetteer lookup databases to scan for a recognized named entity; and
- filter each token that fails to match with a named entity to quickly identify a token that contains the named entity.

18. The apparatus of claim 11, wherein the set of instructions are further configured to cause the at least one processor to
- remove duplicates for the one or more named entities by comparing a result from a short-phrase classifier, a regular text classifier, a gazetteer lockup database, or any combination thereof.

19. The apparatus of claim 11, wherein the set of instructions are further configured to cause the at least one processor to
- combine one or more tokens to form the one or more named entities, the one or more tokens are results from a short-phrase classifier, a regular text classifier, a gazetteer lockup database, or any combination thereof.

20. The apparatus of claim 11, wherein the set of instructions are further configured to cause the at least one processor to
- select a superset of the one or more named entities when a short-phrase classifier, a regular text classifier, a gazetteer lockup database, or any combination thereof returns the superset of the one or more named entities and a subset of the superset of the one or more named entities.

21. A computer-implemented process, comprising:
- tokenizing an electronic message received from another computing device;
- probabilistically identifying, using either a short-phrase classifier or a regular text classifier, whether each token constitutes a named entity, thereby identifying one or more named entities within the electronic message, wherein each token is a continuous sequence of characters grouped together and wherein the probabilistically identifying comprises accessing the short-term classifier or the regular text classifier depending on whether the number of tokens being less than or equal to a predefined number or a threshold number; and
- returning a response message to the user when the one or more named entities are found in the electronic message, or
- returning a null response message when the comparison fails to identify named entities in the electronic message.

* * * * *